March 15, 1927. 1,620,622
R. G. AREY
ELECTRICAL MEASURING INSTRUMENT
Filed May 17, 1926

Inventor:
Ralph G. Arey
by Attorney
Owen N. Kennedy

Patented Mar. 15, 1927.

1,620,622

UNITED STATES PATENT OFFICE.

RALPH G. AREY, OF WORCESTER, MASSACHUSETTS, ASSIGNOR TO LUNDQUIST TOOL AND MANUFACTURING COMPANY, OF WORCESTER, MASSACHUSETTS, A COPARTNERSHIP CONSISTING OF AUGUST F. LUNDQUIST AND EINAR B. LUNDQUIST.

ELECTRICAL MEASURING INSTRUMENT.

Application filed May 17, 1926. Serial No. 109,626.

My invention relates to electrical measuring instruments and has for its object to provide improved means whereby the movable indicating pointer of an instrument, such as a volt meter or ammeter, may be readily adjusted with respect to the fixed calibrated scale of the instrument.

For purposes of illustration, I have shown my invention in connection with a portable type of instrument that is extremely cheap and simple in construction, the use of my invention enabling instruments of this type to be assembled and adjusted with a minimum expenditure of labor. The above and other advantageous features of my invention will hereinafter more fully appear, reference being had to the accompanying drawings in which—

Like reference characters refer to like parts in the different figures.

Figure 2:
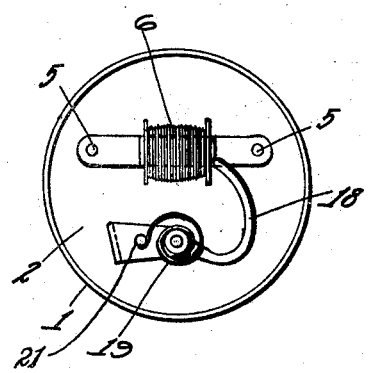
Fig. 2 is a rear view of the instrument shown in Fig. 1, with the back cover removed.

Referring to the drawings, the instrument comprises a cup shaped casing 1 which provides a depressed base portion 2, the open end of the casing 1 being closed by a cover 3. A calibrated dial 4, is located in the depression in front of the base 2 and is secured to the plate 9 by rivets 5, see Fig. 2, which also serve to hold a conductive coil 6 in position on the back of the base 2. A glass 7 is held in front of the dial 4 by means of a ring 8 having a close fit with the casing 1.

Figure 3:
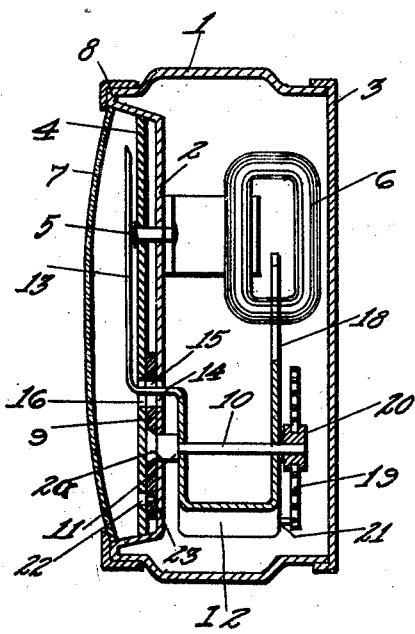
Fig. 3 is an enlarged sectional view along the line 3—3, Fig. 1, looking in the direction of the arrows.
Figure 4:
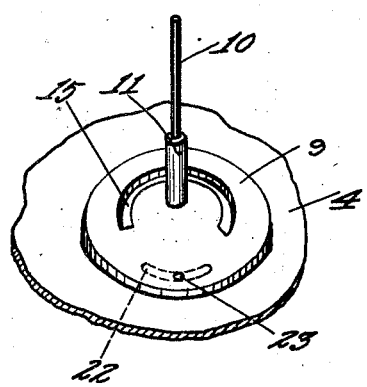
Fig. 4 is a perspective view showing, on an enlarged scale, an adjustable arbor embodying my invention.

As clearly shown in Figs. 3 and 4, a small anchor plate 9 is frictionally held between the base 2 and the dial 4, and this plate 9 has rigidly secured thereto an arbor 10 which extends rearwardly through an opening 2ª in the base 2. The arbor 10 provides a shoulder or enlarged portion 11 which serves to position an armature member 12 on the arbor 10. The armature member 12 is rotatable on the arbor 10 and has attached thereto a pointer 13 which extends through alined openings 14, 15 and 16, provided in the base 2, the plate 9, and dial 4, respectively. The pointer 13 extends across the face of the dial 4 and is adapted to be moved with respect to the scale markings 17 by the influence of the conductive coil 6 on the armature extension 18.

The armature member 12 is adapted to be held with its pointer 13 approximately on the zero mark of the scale, with the coil 6 deenergized, by means of a spring 19. This spring 19 is secured at one end to a disk 20 fast on the arbor 10, while its other end is secured to an extension 21 of the armature member 12. The spring opposes the pull of the coil 6 on the armature extension 18, and when the coil 6 is deenergized it tends to bias the pointer 13 towards the approximate zero of the scale markings 17 on the dial 4. When assembling the instrument, and securing the free end of the spring 19 to the armature member 12, it is difficult to cause the spring 19 to hold the pointer 13 exactly on the zero, and my improved arbor adjustment provides means for setting the pointer 13 exactly at zero with a minimum expenditure of time and labor.

As previously pointed out, the plate 9 which carries the arbor 10 is frictionally held between the dial 4 and the base 2, lateral movement of the plate 9 being prevented by the fact that the arbor 10 passes through the opening 2ª in the plate 2. It is evident however, that the plate 9 is capable of angular movement between the base 2 and the dial 4, and in order to give access to the plate 9, an arcuate slot 22 is provided in the dial 4. As clearly shown in Figs. 3 and 4, the plate 9 is provided with an opening 23 which, when the parts are assembled, registers with the slot 22; consequently the plate 9, and with it the arbor 10, can be turned by inserting a pointed tool through the slot 22 into the opening 23.

Figure 1:
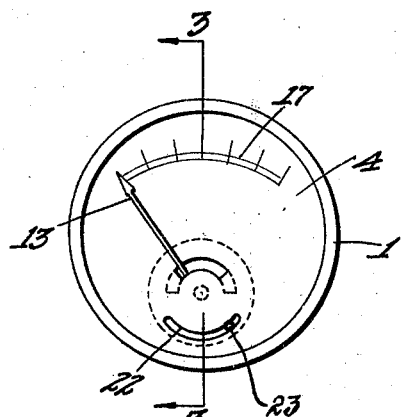
Fig. 1 is a front view of an instrument embodying my invention, with the front cover removed.

Assuming that the parts have been assembled with the spring 19 holding the pointer 13 near the zero mark, it is obvious that the pointer can be brought to bear exactly on the zero by turning the plate 9, and with it the arbor 10, thus shifting one end of the spring 19. It is obvious that this operation can be readily performed while looking directly at the dial 4, as in Fig. 1, thus facilitating quick and accurate adjustment of the instrument. Should the instrument, after it has been in use, exhibit some slight error in its zero reading, the pointer 13 can always be quickly brought to zero by removing the glass 7 and ring 8 and making the necessary arbor adjustment by means of the slot 22 and opening 23. This adjustment in no way disturbs the delicate spring 19 or the armature member 12, and obviously it can be made by any ordinary user of the instrument.

I claim,

1. An electrical measuring instrument comprising a fixed scale, a conductive coil, an arbor, an armature, rotatable on said arbor, carrying a pointer, a spring rigidly connected at its ends to said arbor and said armature opposing the pull of said coil adapted to bias said pointer toward the zero of the scale, and means accessible from the front of the scale for angularly adjusting said arbor to bring said pointer on the zero of the scale.

2. An electrical measuring instrument comprising a casing providing a base, a calibrated dial secured to said base, a plate carrying an arbor frictionally clamped between said base and said dial, an armature rotatable on said arbor carrying a pointer adapted to move over said dial, a spring connected at its ends to said arbor and to said armature, respectively, for biasing the pointer, and means for turning said arbor plate to adjust the position of the pointer on the dial.

3. An electrical measuring instrument comprising a casing providing a base, a calibrated dial secured to said base, a plate carrying an arbor frictionally clamped between said base and said dial, an armature rotatable on said arbor carrying a pointer adapted to move over said dial, a spring connected at its ends to said arbor and to said armature respectively for biasing the pointer, and means accessible from the face of the dial for turning said arbor plate to thereby adjust the position of the pointer on the dial.

RALPH G. AREY.